United States Patent [19]

Lanfri

[11] Patent Number: 4,795,134
[45] Date of Patent: Jan. 3, 1989

[54] VALVE WITH IMPROVED SEALING PROPERTIES

[75] Inventor: James A. Lanfri, Campbell, Calif.

[73] Assignee: Huntington Mechanical Laboratories, Inc., Mountain View, Calif.

[21] Appl. No.: 54,797

[22] Filed: May 27, 1987

[51] Int. Cl.$^4$ .............................................. F16K 31/00
[52] U.S. Cl. .................... 251/335.3; 251/368
[58] Field of Search ............... 251/335.1, 335.2, 335.3, 251/368, 367

[56] References Cited

U.S. PATENT DOCUMENTS

| | | | |
|---|---|---|---|
| 3,101,094 | 8/1963 | McKenzie | 251/335.3 |
| 3,759,282 | 9/1973 | Kaldenback et al. | 251/368 |
| 3,810,486 | 5/1974 | Gutekunst | 251/367 |
| 4,270,727 | 6/1981 | Norman | 251/335.3 |
| 4,421,298 | 12/1983 | Kujawslci | 251/335.3 |
| 4,431,159 | 2/1984 | Stubbs | 251/335.3 |

*Primary Examiner*—A. Michael Chambers
*Attorney, Agent, or Firm*—David Pressman

[57] ABSTRACT

A valve with improved sealing properties comprises a housing (10a) with an inlet pipe (12a), an outlet pipe (16a) and a flange (54) which is closed by a first cover (52). An annular copper seal (24a) is placed between the flange (54) and the first cover. The first cover is closed with a thrust cover (60) which is connected to the flange by bolts (68) which pass through holes (64) in the first cover and are threaded to the flange. A valve stem (36a), a threaded portion (34a) of which is screwed into a central threaded opening (62), is inserted into the valve housing. The valve stem carries a valve head (38a) which is rotatable with respect to the valve stem and engages a valve seat 48a inside the housing. The threaded connection between the valve stem and the interior of the valve housing is sealed by a bellows (50a). When the valve is tightened in its closed position, by rotating the valve stem, the valve head will be pressed to the valve seat (48a), and a lifting reactive forces is applied to the thrust cover, rather than to the first cover, as in conventional valves of this type. Thus the sealed contact between the first cover and the flange is not compromised, and sealing properties of the valve are preserved, even after annealing of the copper seal (24a) which may be caused by baking required for cleaning the interior of the valve chamber for high-vacuum applications.

8 Claims, 2 Drawing Sheets

VALVE WITH IMPROVED SEALING PROPERTIES

BACKGROUND

1. Field of the Invention

This invention relates to valves with improved sealing properties, particularly to valves for high-pressure of high-vacuum applications for which improved sealing is an important property.

2. FIG. 1—Description of Prior Art

Valves for high-vacuum or high-pressure applications are widely used in various fields of industry. For example, valves used in the manufacture of semiconductors must withstand a vacuum as low as $10^{-14}$ torr (torr=0.01216 atmosphere), while valves employed in pneumatic or hydraulic systems may work under pressures exceeding 100 kg/cm$^2$.

One existing valve, which is intended for high-vacuum applications and is produced by Huntington Laboratories, Inc., Mountain View, Calif., is shown in FIG. 1. It consists of a valve housing 10 which has an inlet pipe 12 with an inlet mounting flange 14 and an outlet pipe 16 with an outlet mounting flange 18. On the side opposite to outlet pipe 16, the housing is closed by a cover 20 which rests on a cover flange 22. A copper, annular seal 24 is placed between the mating surfaces of cover 20 and its flange 22. Cover 20 and its flange 22 are tightened together by bolts 26 which pass through holes 28 in cover 20 and are screwed into threaded holes 30 in cover flange 22. Bolts 26 are tightened so that the interface between cover 20 and flange 22 is reliably sealed.

Cover 20 has a central threaded opening 32. A threaded portion 34 of a valve stem 36 is screwed into opening 32. The lower end of stem 36 is located inside valve body 10 and carries a valve head 38 which bears a copper gasket 40. The latter is replaceable and attached, for example, by a screw 42.

The upper part of valve stem 36 protrudes outside the valve and carries a handle or an actuator 44 which can be attached to stem 36, e.g, by a screw 46.

Above outlet pipe 16, valve housing 10 has a valve seat 48 which cooperates with copper gasket 38.

For sealing the threaed connection between the stem's threads 34 and opening 32, a cylindrical bellows 50 is placed inside valve housing 10 around valve stem 36 between cover 20 and valve head 38. Bellows 50 is welded at its upper end to cover 20, forming a sealed weld seam 51, and at its lower end to valve head 38, forming a sealed welded seam 53.

In order to allow rotation of valve stem 36 with respect to valve head 38 and at the same time to fix both parts in the axial direction, valve stem 36 has, at its lower end, a collar 37 which is fitted rotatably in a recess 39 of valve head 38. Axial fixation is provided by means of a flanged edge 41 formed on the lower end of bellows 50. This flanged edge overlaps a portion of collar 37 to form a sliding-type thrust bearing. The bearing can be replaced by a thrust-type ball bearing.

For vacuum application, all parts of the valve (except for copper seal and gasket) are usually made of stainless steel.

OPERATION OF PRIOR-ART VALVE OF FIG. 1

To close the prior-art valve shown in FIG. 1, actuator 44 is turned until copper gasket 40 comes into tight contact with valve seat 48. At this moment, valve stem 36 and valve head 38 become immobile with respect to housing 10. However, because of the threaded connection between portion 34 of valve stem 36 and threaded opening 32 of cover 20, further tightening of the valve (i.e., rotation of actuator 44 and hence valve stem 36) will create a reactive force with respect to cover 20. This reactive force will try to raise cover 20 with respect to flange 22 of valve body 10. This will tend to unseal annular seal 24. Thus, final tightening of the valve in its closed position will create forces which will tend to unseal the valve.

This problem becomes still more aggraveted when the valve is subjected to baking at temperatures up to 450° C. Baking is commonly used for cleaning the interior of the systems designed for ultra-high vacuum application (down to $10^{-14}$ torr). Baking at such temperature anneals copper seal 24 so that even slightest displacement between cover 20 and flange 22 may break the seal betwen these parts.

Thus the industry would benefit by a valve which have improved sealing properties and is free of above-described disadvantages.

OBJECTS AND ADVANTAGES OF THE INVENTION

Accordingly, several objects of the present invention are to provide a valve with improved sealing properties which is reliable in operation and is suitable for high-vacuum and high-pressure applications, which preserves its sealing properties after final tightening of the valve head against the valve seat as well as after baking at high temperatures, and in which tightening does not create reactive forces tending to raise the cover from the valve body flange and thus to unseal the valve. Further objects and advantages will become apparent from the ensuing description and drawings.

DRAWINGS

Figure 1:
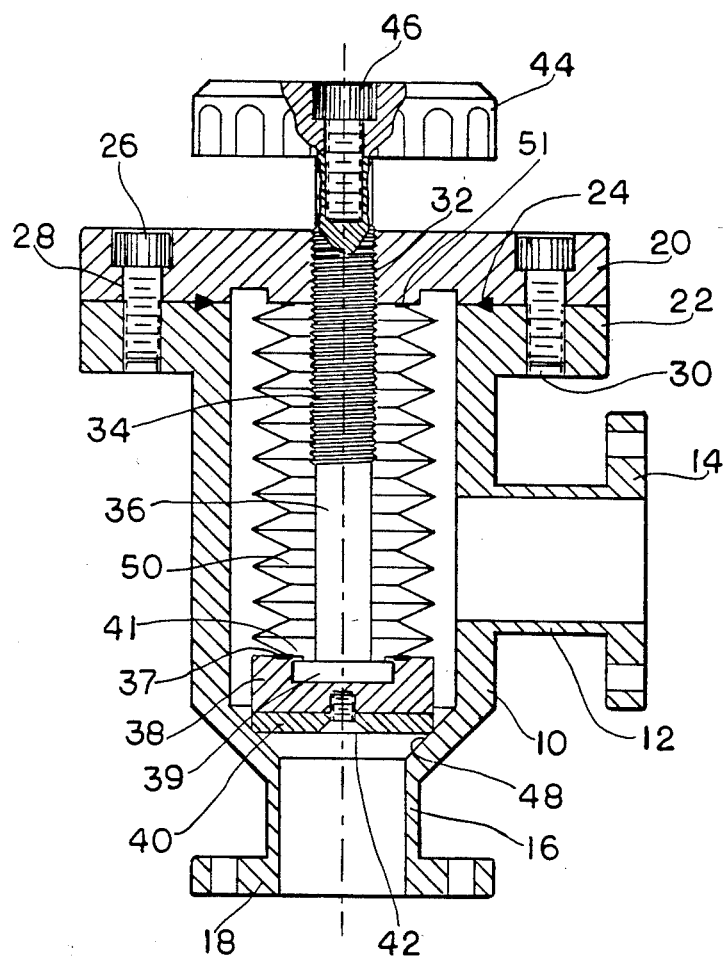
FIG. 1 is a vertical sectional view of a prior art valve.

REFERENCE NUMERALS USED IN THE DESCRIPTION AND DRAWINGS 10, 10a—housing
12, 12a—inlet pipe
14, 14a—mounting flange
16, 16a—outlet pipe
18, 18a—mounting flange
20—cover
22—flange
24, 24a—seal
26, 26a—bolts
28, 28a—holes
30, 30a—threaded holes
32—threaded opening
34, 34a—threaded portion
36, 36a—valve stem
37—collar
38, 38a—valve head
39a—recess
40, 40a—copper gasket
41a—flanged edge
42, 42a—screw
44, 44a—actuator
46, 46a—screw 48, 48a—valve seat
50, 50a—bellows
51, 53—weld seams
52—cover
54—flange
56—opening
58—gap
60—thrust cover
62—threaded opening
64—opening
66—threaded opening
68—bolt
70—gap

FIGS. 2 AND 3—DESCRIPTION OF VALVE WITH IMPROVED SEALING PROPERTIES

Figure 2:
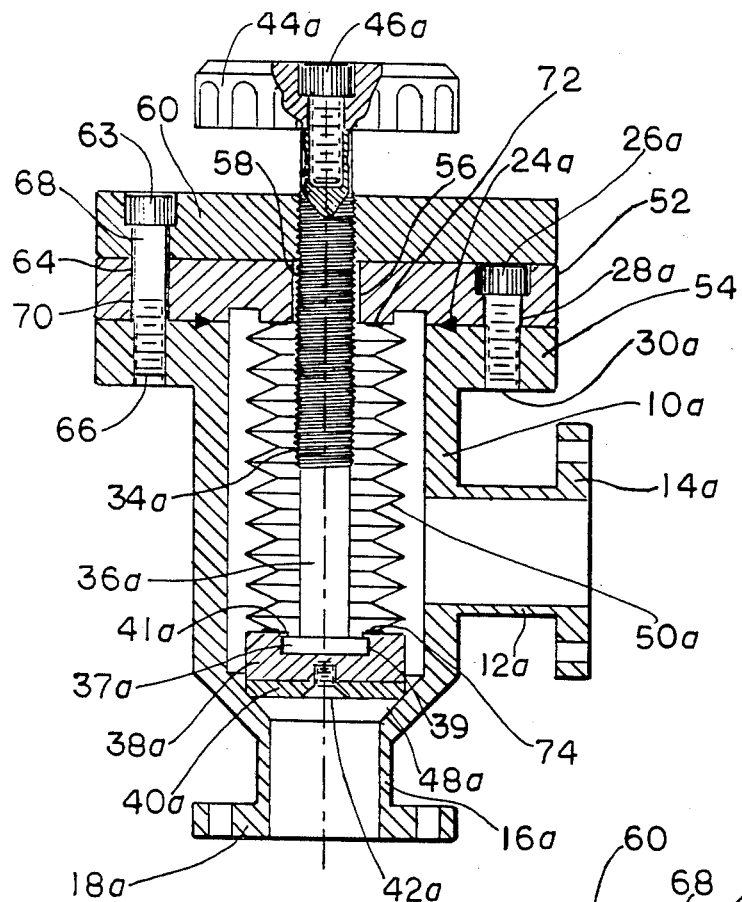
FIG. 2 is a vertical sectional view valve made according to the present invention.
Figure 3:
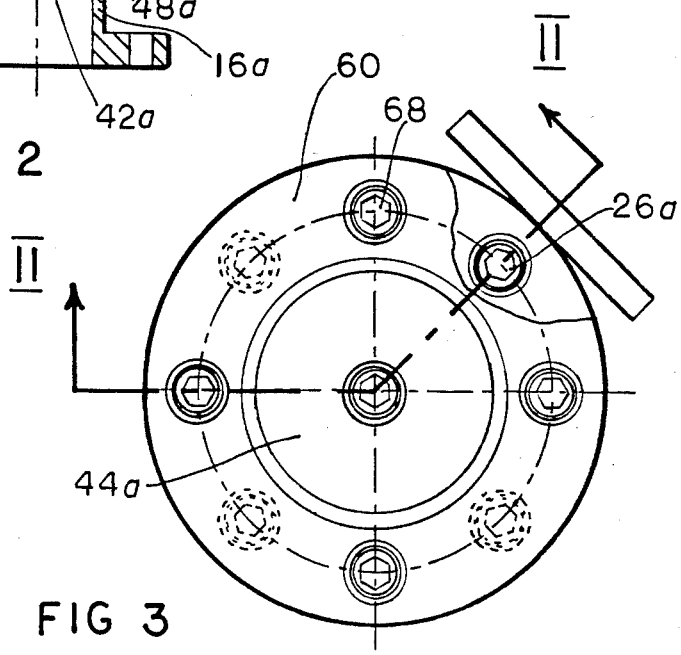
FIG. 3 is a top view of the valve shown in FIG. 2 (FIG. 2 is taken along line II—II of FIG. 3).

A valve in accordance with one preferred embodiment of the invention is shown in FIG. 2, which is a vertical cross-sectional view of the valve along lines II—II of FIG. 3, and in FIG. 3, which is a top view of the valve of FIG. 2.

Parts of the valve of the invention identical with those of the conventional valve of FIG. 1 will be designated with the same reference numerals but with addition of the suffix "a".

Similar to the valve of FIG. 1, the valve shown in FIGS. 2 and 3 consists of a valve housing 10a which has an inlet pipe 12a with a mounting flange 14a and an outlet pipe 16a with a mounting flange 18a. On the side opposite to outlet pipe 16a, the housing is closed by a cover 52 which rests on a flange 54. A copper ring-like seal 24a is placed between the mating surfaces of cover 20a and flange 22a. Cover 52 and flange 54 are tightened together by bolts 26a which pass through recessed holes 28a in cover 20a and are screwed into threaded holes 30a in flange 54. Bolts 26a are tightened so that interface between cover 52 and flange 43 is reliably sealed.

Cover 52 has a non-threaded central opening 56. A threaded portion 34a of a valve stem 36a passes through opening 56 with a predetermined clearance between the edges of the threads and the sides of openings 56 which can be within the range of 1 to 3 mm, depending on the size of the valve and its tolerances. The lower end of the stem is located inside valve body 10a and carries a valve head 38a which bears a copper gasket 40a. The latter is replaceable and attached, for example, by a screw 42a.

The upper part of valve stem 36a protrudes outside the valve and carries a handle or an actuator 44a which can be attached to stem 36a, e.g., by a screw 46a.

Above outlet pipe 16a, valve housing 10a has a valve seat 48a which cooperates with copper gasket 38a to create a tight seal.

Except for opening 56 in cover 52, the elements of the valve described above are in general similar to those of the prior art valve shown in FIG. 1. The distinguishing features of the invention will now be described in more detail.

A thrust cover 60 is placed over cover 52. Cover 60 has a central threaded opening 62. The above-mentioned threaded portion 34a of valve stem 36a is screwed into opening 62. Thrust cover 60 is provided with recessed openings 62 which are axially aligned with through openings 64 in cover 52 and with threaded openings 66 in flange 54. Bolts 68 pass through openings 62 and 64 with gaps 70 of a predetermined size and are screwed into threaded holes 66 of flange 54.

As shown in FIG. 3, openings 62, 64, and 66 are uniformly spaced from each other in a circumferential direction and are arranged in an alternating order with respect to openings 28a and 30a. Although four bolts 26 and respective openings as well as four bolts 68 and their respectivve openings are shown, the covers and flanges may have different number of the above-mentioned bolts and openings.

For sealing the threaded connection between threaded portion 34a and threaded opening 62, a cylindrical-shaped bellows 50a is placed inside valve housing 10a around valve stem 36a between cover 52 and valve head 38a. Bellows 50a is welded at its upper end to a cover 52, forming a sealed weld seam 72, and at its lower end to valve had 38a, forming a sealed welded seam 74.

In order to allow rotation of valve stem 36a with respect to valve head 38a and at the same time prevent axial movements of both parts, valve stem 36a has a collar 37a at its lower end which is fitted rotatably in a recess 39a of valve head 38a. Axial fixation is provided by means of a flanged edge 41a formed on the lower end of bellows 50. This flanged edge overlaps a portion of collar 37a to provide a sliding-type thrust bearing. This bearing can be replaced by a thrust-type ball bearing.

For high-vacuum applications, all parts of the valve (except for the copper seal and gasket) can be made of stainless steel. Bellows 50a can be welded to cover 52 and to valve head 38a by continuous and sealed seams 72 and 74, respectively.

OPERATION OF VALVE OF FIGS. 2 AND 3

For closing the valve shown in FIGS. 2 and 3, actuator 44a is turned until copper gasket 40a comes into tight contact with valve seat 48a. At this moment, valve stem 36a and valve head 38a become immobile with respect to housing 10a. In contrast to the valve of FIG. 1, however, continuing tightening of the valve, i.e., rotation of actuator 44a and hence valve stem 36a, will not creaate a reactive force with respect to cover 52, but rather with respect to thrust cover 60. This is because threaded part 34a of valve stem 36a has threaded connection, not with cover 52, but with thrust cover 60. Even though thrust cover 60 is raised with respect to cover 52, it will not apply a reactive force to the latter and therefore will not compromise the hermetic seal provided by annular seal 24a. Thus the valve of the invention is free of the problems inherent in the conventional valve of this type shown in FIG. 1.

Even though baking of the valve at a temperature of about 450° C. may to some extent anneal copper seal 24a, it will not impair the sealing properties of the valve, since the above-mentioned seal is unloaded and flange 52 preserves its initial position on flange 54 even after final tightening of the valve.

SYNOPSIS, REMIFICATIONS, AND SCOPE

Thus it has been shown that the present invention provides a valve with improved sealing properties which is reliable in operation and is suitable for high-vacuum and high-pressure applications. The valve preserves its sealing properties after final tightening of the valve head against the valve seat as well as after baking at high temperature. Tightening of the valve does not create reactive forces tending to raise the cover from the valve body flange and thus to unseal the valve.

While the present invention has been illustrated in the form of a specific embodiment shown in FIGS. 2 and 3, those skilled in the art will understand that this embodiment have been given only as an example and that many other modifications are possible within the scope of the appended claims. For example, manually-driven actuator 44a can be replaced by an actuator which is driven mechanically, e.g., from a hydraulic or pneumatic cylinder. Valve housing 10a may have a welded or cast construction. Inlet and outlet pipes 12a and 16a, respectively, may be located in different places of the housing. Covers 60, 52, and flange 54 may have number of holes for bolts 26a and 68, other than that shown in FIG. 3. The valve parts can be made from materials other than stainless steel and copper, and the valve itself can be intended for use not under high vacuum, but rather under high pressure. Bellows 50a can be replaced by telescopically fitted sleeves with seals between the sliding sleeves. A sliding-type thrust bearing between the valve stem and the valve head was shown only as an example and can be substituted by a thrust ball bearing. Therefore the scope of the invention should be determined, not by the examples given, but by appended claims and their legal equivalents.

I claim:

1. A valve with improved sealing properties, comprising:
   a housing open from one side and having an inlet opening, an outlet opening, a flange on said open side, and a valve chamber with a valve seat in said housing;
   a first cover which rests on the surfae of said flange and has a central opening;
   a first sealing means on an interface between the mating surfaces of said first cover and said flange of said housing;
   a plurality of first through recessed holes in said cover and a plurality of first threaded holes in said flanges which are aligned with said first through recessed holes;
   a plurality of bolts which pass through said first recessed holes and are screwed into said first threaded holes of said flange, respectively, so that said first cover is rigidly attached to said flange;
   a second cover placed onto said first cover and having a central threaded opening; a plurality of second through recessed holes in said second cover, a plurality of third through holes in said first cover, and second threaded holes in said flange, said second through recessed holes, said third through holes and said second threaded holes being aligned with each other;
   a plurality of second bolts which pass through said second through recessed openings and said third through openings and are threaded into said second threaded openings of said flange so that said first cover, said second cover and said flange are clamped together, a gap formed between said second bolts and the inner walls of said third through holes, said first and said second bolts being located in an alternating order;
   a threaded element which is screwed into said central threaded opening of said second cover and passes through said central opening of said first cover so that its one end protrudes into said valve chamber;
   an actuator element removably attached to the part of said threaded element which is located outside of said valve housing;
   a valve head on said end of the threaded element which protrudes into said valve chamber, said head engaging said valve seat and being rotatably connected to said threaded element and fixed against axial displacement with respect thereto;
   and second sealing means which seals the threaded connection between said threaded element and said central threaded hole of said second cover.

2. The valve of claim 1 wherein said first sealing means comprises an annular ring-like element made of copper.

3. The valve of claim 1 wherein said valve head carries a copper gasket which cooperates with said valve seat.

4. The valve of claim 1 wherein said valve housing, said threaded element, said valve head and said first and second bolts are made of stainless steel.

5. The valve of claim 1 wherein said second sealing means for sealing said threaded connection comprises a bellows which is located inside said valve chamber and seals said threaded connection from the interior of said valve chamber.

6. The valve of claim 5 wherein said bellows is made of stainless steel.

7. The valve of claim 5 wherein one end of said bellows is sealingly connected to said first cover while the other end of said bellows is sealingly connected to said valve head, said rotatable and axially-fixed connection between said threaded element and said valve head comprises a recess in said valve head, a collar-like element on the end of said threaded element adjacent to said valve head, said collar-like element being placed in said recess with a sliding fit, and radially and inwardly bent edges on said other end of said bellows which are located above said collar-like element and overlap a part of said collar-like element so that the latter is fixed inside said recess against axial movement with respect thereto.

8. The valve of claim 7 wherein said connection of said bellows is a welded connection.

* * * * *